Nov. 23, 1948.   I. OLSEN   2,454,712
MOLD FOR PRODUCING CRANK SHAFTS
Filed Jan. 12, 1945   5 Sheets-Sheet 1
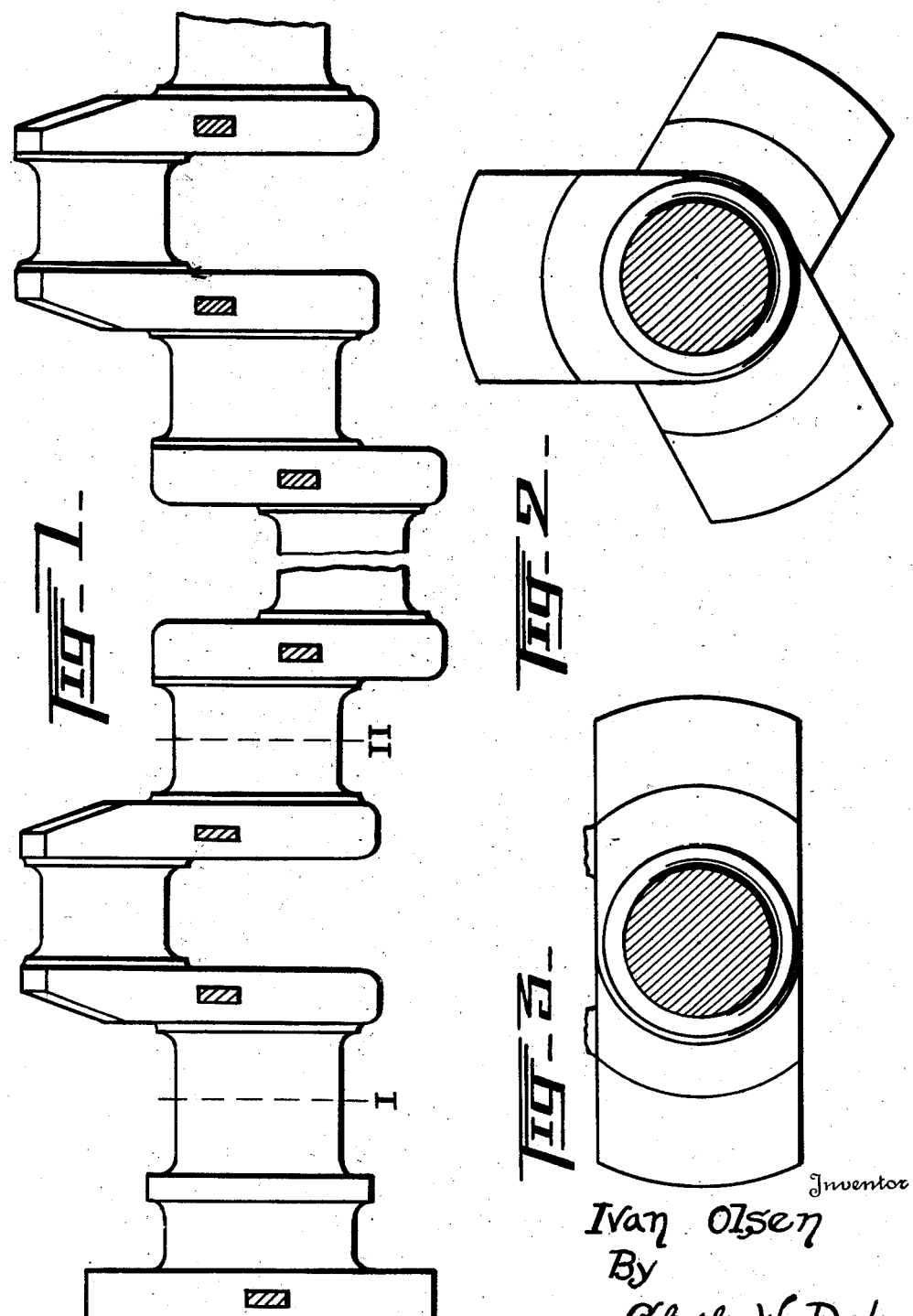
Inventor
Ivan Olsen
By
Charles W. Dake
Attorney

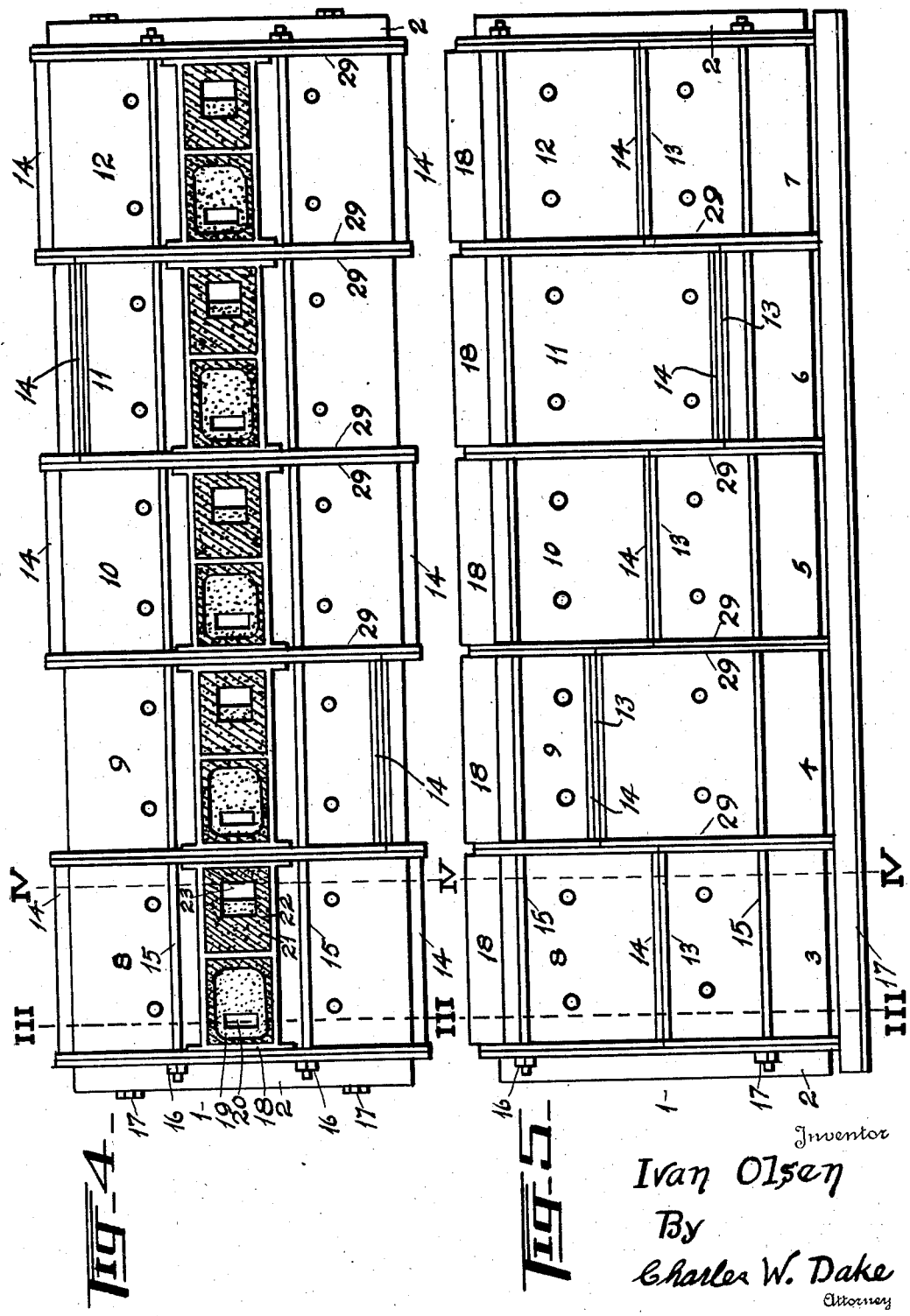

Nov. 23, 1948.  I. OLSEN  2,454,712
MOLD FOR PRODUCING CRANK SHAFTS
Filed Jan. 12, 1945  5 Sheets-Sheet 3
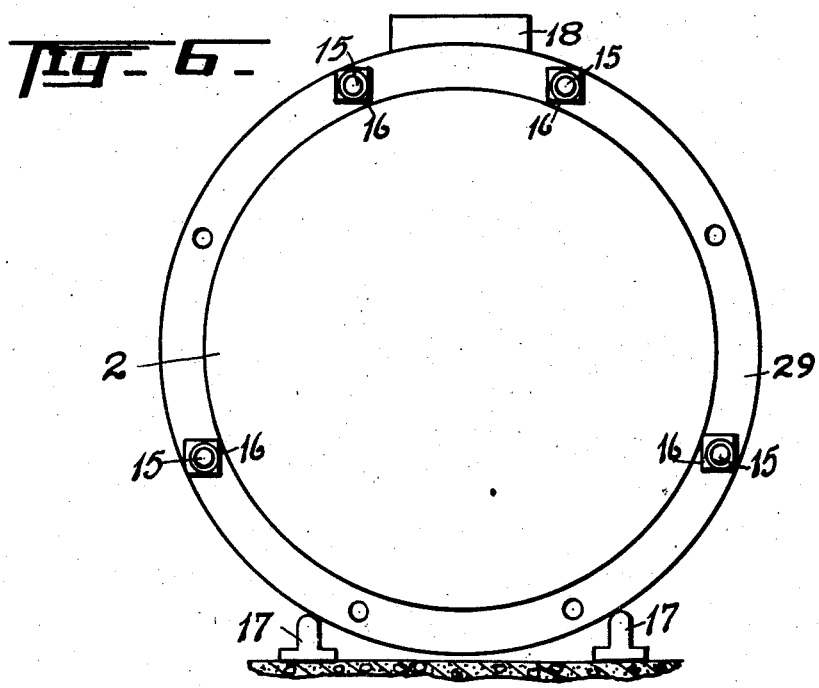
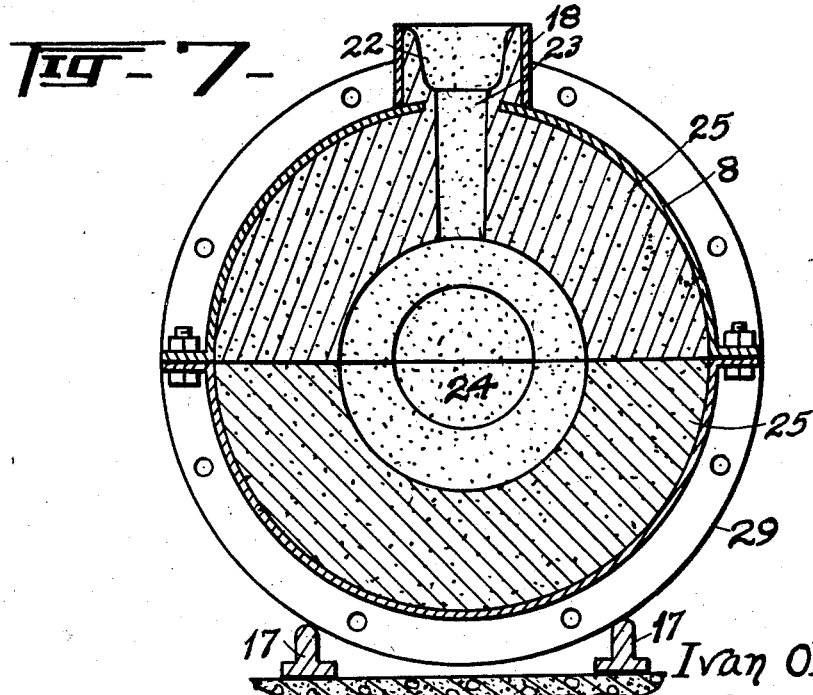
Inventor
Ivan Olsen
By
Charles W. Dake
Attorney Nov. 23, 1948.  I. OLSEN  2,454,712
MOLD FOR PRODUCING CRANK SHAFTS
Filed Jan. 12, 1945  5 Sheets-Sheet 4

Inventor
Ivan Olsen
By
Charles W Dake
Attorney

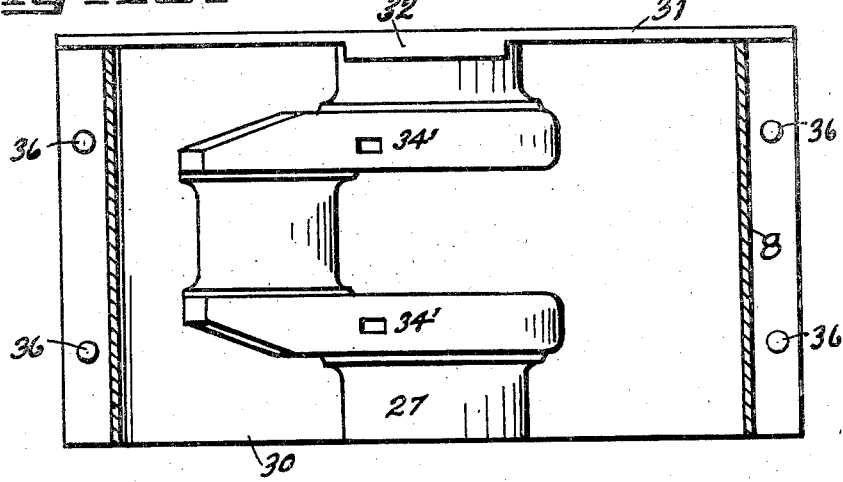
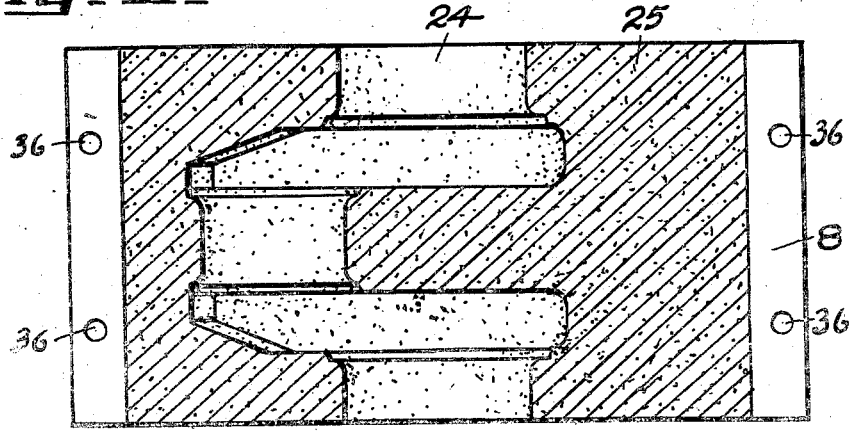
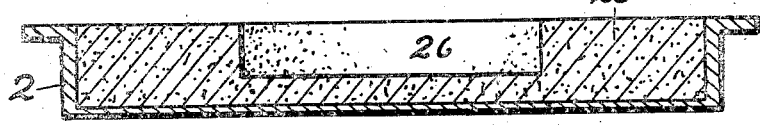

Patented Nov. 23, 1948

2,454,712

UNITED STATES PATENT OFFICE 2,454,712

MOLD FOR PRODUCING CRANKSHAFTS

Ivan Olsen, Muskegon, Mich.

Application January 12, 1945, Serial No. 572,528

1 Claim. (Cl. 22—130)

My present invention relates to improvements in methods of, and apparatuses for producing crank and other similar shafts, and particularly crank shafts for large engines, air compressors and pumps; and the objects of improvement are: first, to provide a simple method of casting heavy crank shafts; second, to provide a method of casting crank shafts whereby the crank shaft will have a uniform structure throughout; third, to provide a method of casting crank shafts that will minimize production of faulty castings; fourth, to provide a method of casting crank shafts that will be readily understood; fifth, to provide a method of casting crank shafts that will be easy to practice; sixth, to provide a method of casting crank shafts in mass production; seventh, to provide a sectional flask and mold adaptable for casting crank shafts having a plurality of cranks of different crank angles; eighth, to provide a flask consisting of a plurality of cylindrical sections each having a mold with a mold cavity therein in which to cast a longitudinal portion of a crank shaft simultaneously with other portions of the crank shaft.

Figure 8:
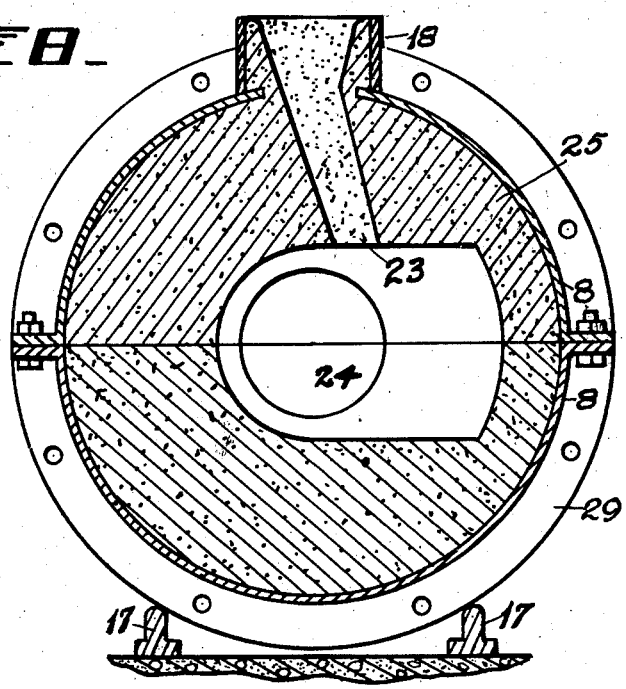
Figure 9:
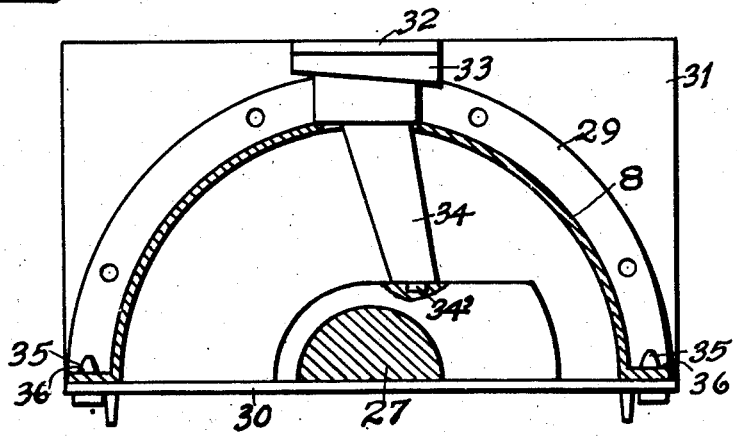

I attain these named objects and such other objects as appear from a perusal of the following description taken with reference to the structure disclosed by the accompanying drawing in which:

Figure 1 is a longitudinal side view of a crank shaft casting as produced by my present method;

Figure 2 an end view of the said crank shaft casting and having crank throws circumferentially spaced 120 degrees apart;

Figure 3 an end view of the crank shaft casting having the cranks thereof diagrammatically opposite each other;

Figure 4 a plan view of the flask assembly containing the mold in which the crank shaft is cast by my method;

Figure 5 a side elevation view of the flask and mold assembly;

Figure 6 an end elevation view of the flask mounted for pouring the molten metal therein to form the crank shaft in the mold in the flask assembly;

Figure 7 a transverse cross-sectional view of the flask and mold therein taken on line III—III of Figures 4 and 5;

Figure 8 a transverse cross-sectional view of the flask and mold taken on line IV—IV of Figures 4 and 5;

Figure 9 an end view of one semicylindrical portion of the flask and shaft pattern mounted on the pattern plate in readiness for filling with molding sand, the flask being shown in section;

Figure 10 a top plan view of one of the pattern plates with a section of the crank shaft pattern mounted thereon;

Figure 11 one of the semicylindrical flask portions with the mold portion adapted to have cast therein the portion extending between lines I and II of Figure 1;

Figure 12 one of the mold end closing sections.

Throughout the several views of the accompanying drawing similar numerals refer to similar parts and portions of the flask and the mold employed in producing cast metal crank shafts by my method, and referring to the drawing:

Numeral 1 designates the flask as a whole, which consists of cylindrical mold end closing sections 2, semicylindrical flask drag portions 3, 4, 5, 6, 7, and semicylindrical cope portions 8, 9, 10, 11 and 12; each drag portion 3, 4, 5, 6 and 7 having an outwardly extending flange 13 at its rim and engaged by outwardly extending flange 14 of each of the cope portions, the flanges 13 and 14 being adapted to be clamped together by the usual conventional flask C clamp. Each of the flask drag portions 3, 4, 5, 6, 7 and cope portions 8, 9, 10, 11 and 12, including the mold end closing portions 2, have at their ends an outwardly extending semicircular or circular flange through which extends from end to end of the flask 1 bolts 15, with nuts 16 screw threaded thereon at each of their ends whereby the several portions of the flask assembly are drawn into engagement with each other and as assembled are mounted rotatably on rails 17 in transversely spaced apart and parallel relation to each other.

Mounted on the top of each cope portion 8, 9, 10, 11 and 12, is a runner and riser box 18 held between the outwardly extending semicircular flange at each end of each said cope portion and having therein refractory runner basin 19 which extends to the higher portions of the mold cavity gate hole 20, and another compartment 21 having refractory feeder head member 22 therein with feed sprue hole 23 extending therefrom to the mold cavity designated by numeral 24 in Figures 7, 8, 11, and conforms in shape to that of the portion of the crank shaft to be cast therein, which may be any portion of its length included in any of the flask portions 3, 4, 5, 6, 7, 8, 9, 10, 11, 12. Numeral 25 designates the mold material of each of said portions; the mold material in the mold closing portion 2 which has cavity 26 providing a shrinkage chamber with the metal therein preventing piping of the casting.

Numeral 27 refers to a portion of the crank shaft pattern extending between the lines I and II in Figure 1 of the drawing, which, when the two portions of the mold and the flask portions are assembled, form the mold cavity of a section of the mold in which to cast a portion of a crank shaft. With each section 3, 4, 5, 6, 7 and 8, 9, 10, 11 and 12, and portions 2 fastened together through tie bolts 15, the mold sections form a continuous elongated cylindrical mold with a continuous mold cavity longitudinally thereof.

Each cylindrical section of the mold, consisting of two semicylindrical portions which when assembled, forms a cylindrical portion having annular flanges 29 at each end supported by the rails 17, and when assembled, comprises the complete mold, as shown in Figures 4 and 5, and by virtue of the tie bolts 15, extending through equally spaced apart holes of the annular flanges 29, each section can be fastened to an adjacent section in such position annularly as to produce a crank shaft having any desired angular spacing with its ends closed by portions 2.

In Figures 9 and 10, are shown a longitudinal half portion of a crank shaft pattern mounted on a pattern plate 30 for forming the cope portion of one of the mold sections having upwardly extending back 31 closing the flask portion at its ends with ledge 32 engaged by wedge 33 and as shown in Figure 9 as holding feeder hole forming member 34 in place while the mold in one of the portions of the mold is being formed and extending through the top of one of the flask portions 8, 9, 10, 11, 12, with its smaller end extending to and into pocket 34' of the pattern, the drag portions 3, 4, 5, 6 and 7, have no feeder or gate holes. The pattern plate is provided with upwardly extending pins 35 extending through holes 36 of the flanges 13, 14 of the flask portions, whereby the flask portions are held against displacement on the pattern plate while being filled with molding sand or material and the required spacing of the sections to form the complete mold assembly shown in Figures 4 and 5.

It will be noted that the parting line between the cope and drag flasks may be formed at any angle relative to the sprue opening. With the sprue opening located substantially vertically the parting line may be at any angle thereto to give the proper angle to the offset crank arm of the resultant crank shaft. Thus the cranks may be cast at any desired angle and when a crank is to be located vertically in the completed mold then the sprue opening must be located slightly to one side of vertical center. The cranks of the crank shaft may be cast at any angle around the axis of the shaft as for instance the various angles as shown in Figure 2 of the drawings.

When about to carry out my present method of producing crank shafts, I provide a plurality of similar semicylindrical flask portions each having an outwardly extending flange at the sides with a plurality of bolt holes extending therethrough and a semiannular outwardly extending flange at each end with a plurality of equally spaced apart bolt holes extending therethrough and a pair of mold closing ends each having an outwardly extending flange with bolt holes extending therethrough in equally spaced apart relation to each other and to the bolt holes extending through the semiannular flanges of the semicylindrical flask portions. Having provided the flask and mold ends, I provide a pattern of a portion of the crank shaft which, for producing a crank shaft as shown in Figure 1, would require one pattern from which six similar mold portions would be made each two of which when turned over end to end would comprise a cylindrical mold section to be joined to another similar mold section by the tie bolts 15 extending through the proper holes extending through the outwardly extending semi-annular flanges at the ends of each section for the angular crank throw desired. One section of the mold having a mold cavity adapted to have cast therein the portion of the crank shaft extending from line I to the annular coupling flange at the end of the crank shaft as shown in Figure 1 with the flange itself cast within the cavity 26 of the mold closing end portion. Prior to joining the several mold sections together, all holes extending from the mold cavity in the drag portions of the mold are closed by packing sand therein, and subsequent to assembling of the mold sections on the rails 17, the pouring basin in the runner boss member 18 and the head basin of the sprue hole 23 is formed. There being one sprue hole and one runner basin on each mold section when casting large crank shafts for which the present method is particularly suitable. The multiplicity of runner boxes and feeder extending therefrom prevents short seams in the casting and the feeder sprues permit escape of froth from the top of the molten metal of the casting and provides molten metal for feeding back into the casting to compensate for shrinkage downward of the molten metal as it solidifies in the casting and which by reason of the casting consisting of an irregular shape and of steel is considerable which may be as great as one-quarter of an inch and more.

While I have shown and described and illustrated my present invention as employed in producing crank shafts, it should be understood the method and apparatus can be employed for the casting of other irregular shaped shafts and bars; further, that short bolts extending through the annular flanges at each end of the flask sections can be employed to fasten the adjacent flask sections together to form a continuous mold in which to produce the desired casting.

Having described my present invention, the rights thereto I desire to secure by Letters Patent are:

A crank shaft mold comprising, a plurality of open end cylindrical mold boxes secured together end to end, each mold box comprising a pair of semi-cylindrical flasks secured together, a sand mold and mold cavity within each mold box for forming one crank arm and the adjacent cylindrical portions of the crank shaft, the parting line between the flasks being coincident with the angle of the crank arm and a sprue opening extending from the exterior of each mold box to the mold cavity therein, the mold boxes being secured together so that the parting line of the flasks lie in different angular planes with respect to the central axis of the crank shaft.

IVAN OLSEN.

REFERENCES CITED

The following references are of record in the file of this patent:

UNITED STATES PATENTS

| Number | Name | Date |
|---|---|---|
| 521,450 | Adams | June 19, 1894 |
| 1,291,390 | Broddbent | Jan. 14, 1919 |
| 1,992,677 | Sorensen | Feb. 26, 1935 |
| 2,303,608 | Campbell | Dec. 1, 1942 |